Jan. 9, 1934.  A. D. PENTZ  1,942,829
HOSE FOR VEHICLE BRAKES
Filed Oct. 6, 1931
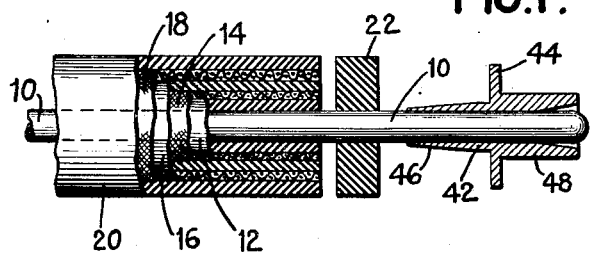
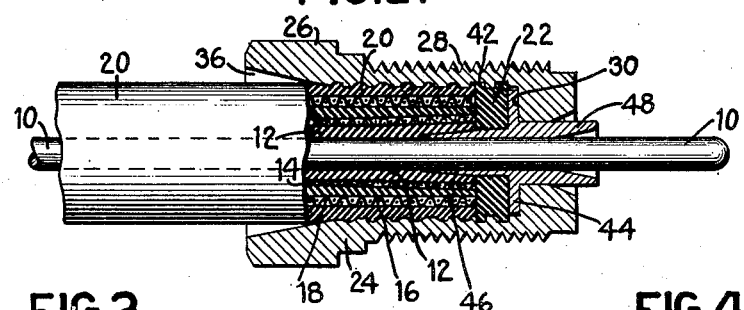
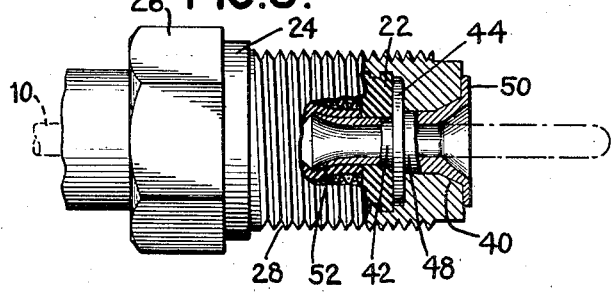  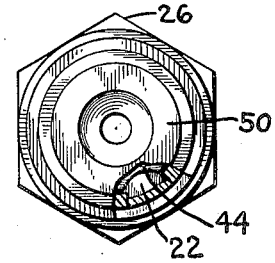
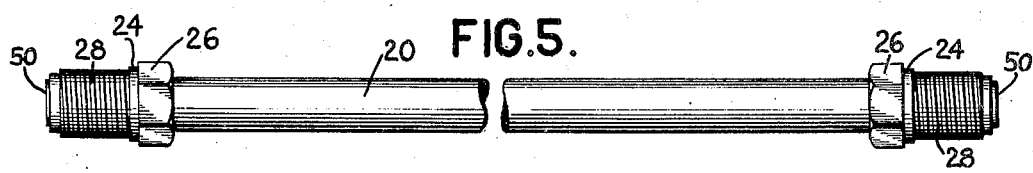
INVENTOR
Albert D. Pentz
BY  ATTORNEYS
Cooper, Kerr & Dunham Patented Jan. 9, 1934

1,942,829

UNITED STATES PATENT OFFICE 1,942,829

HOSE FOR VEHICLE BRAKES

Albert D. Pentz, New York, N. Y., assignor to Pentz Motor Brake Corporation, New Brighton, N. Y., a corporation of New York Application October 6, 1931. Serial No. 567,212

9 Claims. (Cl. 285—84)

This invention pertains to hose especially adapted for hydraulic brakes for vehicles, or for other uses where the service is severe.

The principal object of the invention is to provide a new and improved coupling fitting vulcanized to the hose, in order to overcome the serious problems now encountered in the use of present devices in which it has been found difficult to prevent leakage between hose and coupling.

Further and other objects and advantages will be apparent from the specification and claims, and from the accompanying drawing which illustrates what is now considered the preferred embodiment of the invention.

In the drawing:

Fig. 1 is an exploded view, mostly in section, of the various parts, before assembly.

Fig. 2 shows the parts of Fig. 1 assembled.

Fig. 3 shows the parts of Fig. 2 after the ferrule hub has been flanged over.

Fig. 4 is an end view of Fig. 3, partly broken away.

Fig. 5 is an external view of a finished hose assembly as adapted for an automobile.

According to this invention the parts are first assembled on a mandrel 10, and then vulcanized together, after which the mandrel is withdrawn. A suitable coating is applied to the mandrel to prevent adhesion during vulcanization.

The hose, in its preferred form, comprises an inner green rubber tube 12, an inner layer of woven fabric 14, an intermediate layer of green rubber 16, an outer layer of woven fabric 18, and an outer green rubber casing 20. At the end of the hose is a green rubber sealing and connecting ring 22 of washer-like form hereinafter referred to as a washer.

The coupling fitting has a metal shell 24, having externally a hexagon wrench-receiving portion 26, and a threaded portion 28. Internally, the shell is counter-bored to provide a shoulder 30 and a substantially cylindrical portion, which adjacent shoulder 30 has parallel grooves 32, and throughout the balance of its length has screw threads 34, preferably of the contour shown and preferably slightly tapered as shown. The large end of the shell interior is tapered outwardly to provide clearance space 36 between hose and coupling. The other end of the shell is bored cylindrically as at 38 and tapered as at 40.

A ductile ferrule 42, having an integral collar 44, a tapered portion 46 and a hub 48, is placed in the coupling shell with collar 44 against shoulder 30, hub 48 projecting through bores 38, 40, and tapered portion 46 forced through washer 22 and into the bore of rubber tube 12.

The parts are assembled as in Fig. 2 by placing ferrule 42 and mandrel 10 in the shell as shown, inserting washer 22 over the tapered portion of the ferrule, and allowing it to expand into grooves 32, and then screwing threads 34 of the coupling onto the end of the hose until washer 22 and collar 44 are tightly compressed between the end of the hose and shoulder 30 of the coupling.

After the parts are thus assembled as in Fig. 2, the projecting portion of hub 48 is spun outwardly into tapered bore 40 and over the outer end of the coupling shell to form collar 50 thereon (Fig. 3) to serve as a gasket when the coupling is screwed into a socket or companion fitting.

For automobile use the hose and couplings are usually assembled as in Fig. 5, i. e. a length of hose with a fitting on each end. After the assembly is made, and while mandrel 10 is still in place, the assembly is subjected to sufficient heat to vulcanize the green rubber of inner tube 12, intermediate tube 16, outer tube 20, and washer 22 to the parts with which they are in contact. This means that tube 12 is vulcanized to woven layer 14, to ferrule thimble 46, and to washer 22; washer 22 is vulcanized to ferrule thimble 46, to collar 44, to the coupling shell, and to the ends of all layers of the hose; tube 16 is vulcanized to washer 22 and to woven layers 14 and 18; while outer tube 20 is vulcanized into corrugations 34 of the shell, to woven layer 18 and to washer 22. It will be appreciated that the above described process seals the coupling shell to the hose in such a manner that leakage between hose and coupling is impossible.

After the vulcanization has been completed, mandrel 10 is withdrawn in well known manner, and, if desired, the inner end 46 of the ferrule is flared slightly outwardly as at 52 (Fig. 3) by a spinning operation.

It is to be understood that the invention is not limited to the specific embodiment herein illustrated and described but may be used in other ways without departure from its spirit as defined by the following claims.

I claim:

1. An article of manufacture comprising in combination, a length of reinforced hose, a metal fitting surrounding the end of said hose and a rubber sealing and connecting ring vulcanized to the end of said hose and to said fitting, substantially as set forth.

2. An article of manufacture comprising in combination, a length of hose, a metal fitting on the end of said hose, a ductile ferrule within the end of said hose, said ferrule having a collar preventing outward movement thereof with relation to the fitting, a rubber sealing and connecting ring surrounding said ferrule between the end of the hose and said collar, and an annular shoulder overlapping the outer plane surface of said collar and preventing inward movement of the ferrule in the fitting, said hose being vulcanized to said fitting and to said ferrule, and said ring being vulcanized to the end of said hose, to said ferrule, to said collar, and to said fitting.

3. An article of manufacture comprising in combination, a length of hose, a metal fitting around and over the end of the hose; a ductile ferrule within the end of said hose and having a collar in contact with the inner end of said fitting and a hub extending through the end of said fitting and flanged thereover; and means comprising vulcanized rubber for sealing said hose to said fitting and to said ferrule.

4. An article of manufacture comprising in combination, a length of hose formed of annular layers of woven fabric and green rubber, a metal fitting surrounding the end of said hose, and a green rubber washer vulcanized to the ends of said layers of fabric and rubber and to said fitting, substantially as set forth.

5. An article of manufacture comprising in combination, a length of hose formed of annular layers of woven fabric and green rubber, a metal fitting surrounding the end of said hose and having circumferential internal grooves, and a green rubber sealing and connecting ring vulcanized to the ends of said layers of fabric and rubber and into the grooves of said fitting, substantially as set forth.

6. An article of manufacture comprising in combination, a length of hose formed of annular layers of woven fabric and green rubber, a metal fitting surrounding the end of said hose and having circumferential internal grooves, means comprising vulcanized rubber for attaching said hose to some of said grooves, and a green rubber sealing and connecting ring vulcanized to the ends of said layers of fabric and rubber and into others of said grooves of said fitting.

7. An article of manufacture comprising in combination, a length of hose formed of annular layers of woven fabric and green rubber, a ductile ferrule within the end of said hose, said ferrule being adapted to engage said fitting whereby longitudinal movement of said ferrule is prevented, and means for sealing said fitting and said ferrule to said hose, said sealing means comprising a green rubber sealing and connecting ring vulcanized to the ends of said layers of said fabric and rubber, to said fitting and to said ferrule.

8. An article of manufacture comprising in combination, a length of hose formed of annular layers of woven fabric and green rubber, a metal fitting on the end of said hose, a ductile ferrule within the end of said hose, said ferrule having a collar, a rubber sealing and connecting ring surrounding said ferrule between the end of the hose and said collar, said hose being vulcanized to said fitting and to said ferrule, and said ring being vulcanized to the ends of said layers of fabric and rubber, to said ferrule, to said collar, and to said fitting.

9. The method of securing a metal fitting to the end of a length of reinforced hose, which comprises placing a green rubber sealing and connecting ring between said fitting and the end of said hose, and vulcanizing said washer to said hose and to said fitting.

ALBERT D. PENTZ